(12) United States Patent
Prakash et al.

(10) Patent No.: US 9,258,814 B2
(45) Date of Patent: Feb. 9, 2016

(54) CARRIER INDICATOR FIELD FOR CROSS CARRIER ASSIGNMENTS

(71) Applicant: QUALCOMM Incorporated, San Diego, CA (US)

(72) Inventors: Rajat Prakash, San Diego, CA (US); Jelena M. Damnjanovic, San Diego, CA (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/528,105

(22) Filed: Oct. 30, 2014

(65) Prior Publication Data
US 2015/0055600 A1 Feb. 26, 2015

Related U.S. Application Data

(63) Continuation of application No. 12/892,282, filed on Sep. 28, 2010, now Pat. No. 8,902,828.

(60) Provisional application No. 61/248,632, filed on Oct. 5, 2009.

(51) Int. Cl.
*H04W 4/00* (2009.01)
*H04W 72/04* (2009.01)
(Continued)

(52) U.S. Cl.
CPC .......... *H04W 72/042* (2013.01); *H04L 1/0026* (2013.01); *H04L 1/0027* (2013.01);
(Continued)

(58) Field of Classification Search
CPC ..... H04L 5/001; H04L 5/0048; H04L 5/0053; H04W 72/042; H04W 72/0453
See application file for complete search history.

(56) References Cited

U.S. PATENT DOCUMENTS

| 8,059,608 B2 | 11/2011 | Malladi et al. |
| 2005/0207441 A1* | 9/2005 | Onggosanusi et al. ....... 370/464 |

(Continued)

FOREIGN PATENT DOCUMENTS

| TW | 200931860 A | 7/2009 |
| WO | 2006138203 A1 | 12/2006 |
| WO | 2007024936 | 3/2007 |

OTHER PUBLICATIONS

Catt: "Issues on cross carrier scheduling", 3GPP Draft; R1-093531, 3rd Generation Partnership Project (3GPP), Mobile Competence Centre ; 650, Route Des Lucioles ; F-06921 Sophia-Antipolis Cedex; France, No. Shenzhen, China; 20090819, Aug. 19, 2009, XP050351790, [retrieved on Aug. 19, 2009].

(Continued)

*Primary Examiner* — Otis L Thompson, Jr.
(74) *Attorney, Agent, or Firm* — Peng Zhu

(57) ABSTRACT

Techniques for supporting operation on multiple carriers are described. In an aspect, a carrier indicator (CI) field may be used to support cross-carrier assignment. The CI field may be included in a grant sent on one carrier and may be used to indicate another carrier on which resources are assigned. In one design, a cell may determine a first carrier on which to send a grant to a UE, determine a second carrier on which resources are assigned to the UE, set a CI field of the grant based on the second carrier and a CI mapping for the first carrier, and send the grant to the UE on the first carrier. The UE may receive the grant on the first carrier from the cell and may determine the second carrier on which resources are assigned to the UE based on the CI field of the grant and the CI mapping for the first carrier.

30 Claims, 6 Drawing Sheets

(51) Int. Cl.
*H04L 1/00* (2006.01)
*H04L 1/16* (2006.01)
*H04L 1/18* (2006.01)
*H04L 5/00* (2006.01)

(52) U.S. Cl.
CPC ............ *H04L1/0038* (2013.01); *H04L 1/1671* (2013.01); *H04L 1/1854* (2013.01); *H04L 5/001* (2013.01); *H04L 5/0037* (2013.01); *H04L 5/0053* (2013.01); *H04L 5/0094* (2013.01); *H04L 5/0007* (2013.01)

(56) References Cited

U.S. PATENT DOCUMENTS

| | | | |
|---|---|---|---|
| 2006/0274712 A1* | 12/2006 | Malladi et al. | 370/345 |
| 2007/0060178 A1 | 3/2007 | Gorokhov et al. | |
| 2007/0066340 A1* | 3/2007 | Yoon et al. | 455/522 |
| 2007/0104136 A1 | 5/2007 | Pecen et al. | |
| 2007/0201406 A1 | 8/2007 | Yoon et al. | |
| 2007/0206623 A1 | 9/2007 | Tiedemann, Jr. et al. | |
| 2008/0273513 A1* | 11/2008 | Montojo et al. | 370/342 |
| 2010/0061284 A1* | 3/2010 | Chen et al. | 370/311 |
| 2010/0322158 A1* | 12/2010 | Lee et al. | 370/329 |
| 2011/0075624 A1* | 3/2011 | Papasakellariou | H04L 5/0053 370/329 |
| 2011/0080883 A1 | 4/2011 | Prakash et al. | |

OTHER PUBLICATIONS

Catt et al: "Design of DL Control Channel for LTE-A with Carrier Aggregation", 3GPP Draft; R1-093530, 3rd Generation Partnership Project (3GPP), Mobile Competence Centre ; 650, Route Des Lucioles ; F-06921 Sophia-Antipolis Cedex ; France, No. Shenzhen, China; 20090819, Aug. 19, 2009, XP050351789, [retrieved on Aug. 19, 2009].
Huawei, "Issues on Cross-Carrier PDCCH Indication for Carrier Aggregation", 3GPP Draft, R1-093047 Issues on Cross-Carrier Pdcch Indication for Carrier Aggregation, 3rd Generation Partnership Project (3GPP), Mobile Competence Centre, 650, Route Des Lucioles, F-06921 Sophia-Antipolis Cedex, France, No. Shenzhen, China, 20090818, Aug. 18, 2009, XP050351439, [retrieved on Aug. 18, 2009].
Interdigital Communications et al: "Cross, Carrier Operation for Bandwidth Extension", 3GPP Draft; R1-093067, 3rd Generation, Partnership Project (3GPP), Mobile, Competence Centre ; 650, Route Des, Lucioles ; F-06921 Sophia-Antipolis Cedex ; France, No. Shenzhen, China; 20090819, Aug. 19, 2009, XP050351455, [retrieved on Aug. 19, 2009].
International Search Report and Written Opinion—PCT/US2010/051313—ISA/EPO—Jul. 22, 2011.
LG Electronics: "Cross carrier scheduling by PDCCH for multiple carrier aggregation in LTE-Advanced", 3GPP Draft; R1-093249 LTEA Cross CC Scheduling, 3rd Generation Partnership Project (3GPP), Mobile Competence Centre ; 650, Route Des Lucioles ; F-06921 Sophia-Antipolis Cedex ; France, No. Shenzhen, China; 20090818, Aug. 18, 2009, XP050351586, [retrieved on Aug. 18, 2009].
LG Electronics: "Issues on DL/UL Control Signalling in Asymmetric Carrier Aggregation", 3GPP Draft; R1-093252, 3rd Generation Partnership Project (3GPP), Mobile Competence Centre ; 650, Route Des Lucioles ; F-06921 Sophia-Antipolis Cedex ; France, No. Shenzhen, China; 20090818, Aug. 18, 2009, XP050351589,[retrieved on Aug. 18, 2009].
LG Electronics: "PDCCH structure for multiple carrier aggregation in LTE-Advanced", 3GPP Draft; R1-092237 LTEA PDCCH Structure Rev, 3rd Generation Partnership Project (3GPP), Mobile Competence Centre ; 650, Route Des Lucioles ; F-06921 Sophia-Antipolis Cedex ; France, No. San Francisco, USA; 20090508, May 8, 2009, XP050339657, [retrieved on May 8, 2009].
Motorola: "Common PDCCH Design for Carrier Aggregation", 3GPP Draft; R1-091327, 3rd Generation Partnership Project (3GPP), Mobile Competence Centre ; 650, Route Des Lucioles ; F-06921 Sophia-Antipolis Cedex; France, No. Seoul, Korea; 20090318, Mar. 18, 2009, XP050338925, [retrieved on Mar. 18, 2009].
NEC Group: "Further refinement to DL control signalling for carrier aggregation", 3GPP Draft; R1-093226-PDCCH, 3rd Generation Partnership Project (3GPP), Mobile Competence Centre ; 650, Route Des Lucioles ; F-06921 Sophia-Antipolis Cedex; France, No. Shenzhen, China; 20090819, Aug. 19, 2009, XP050351571, [retrieved on Aug. 19, 2009].
NEC Group, "Phich carrier linkage for carrier aggregation", 3GPP TSG-RAN WG1 Meeting #58, Shenzhen, China, R1-093227, Aug. 24-28, 2009.
Panasonic, "Component carrier indication scheme for carrier aggregation", 3GPP Draft, R1-093465, 3rd Generation Partnership Project (3GPP), No. Shenzhen, China, 20090818, Aug. 18, 2009, XP050351735, FRANC.
Qualcomm Europe: "Multicarrier Control for LTE-A", 3GPP Draft; R1-093118 MC Control, 3rd Generation Partnership Project (3GPP), Mobile Competence Centre ; 650, Route Des Lucioles ; F-06921 Sophia-Antipolis Cedex ; France, No. Shenzhen, China; 20090819, Aug. 19, 2009, XP050351489, [retrieved on Aug. 19, 2009].
Qualcomm Europe: "Multicarrier Control for LTE-Advanced", 3GPP Draft; R1-090359, 3rd Generation Partnership Project (3GPP), Mobile Competence Centre; 650, Route Des Lucioles; F-06921 Sophia-Antipolis Cedex; France, No. Ljubljana; 20090108, Jan. 8, 2009, XP050318265, [retrieved on Jan. 8, 2009].
Qualcomm Europe: "Multicarrier Control for LTE-Advanced" 3GPP Draft; R1-090862, 3rd Generation Partnership Project (3GPP), Mobile Competence Centre; 650, Route Des Lucioles; F-06921 Sophia-Antipolis Cedex ; France, No. Athens, Greece; 20090203, Feb. 3, 2009, XP050318712.
Qualcomm Europe: "Multicarrier Control for LTE-Advanced" 3GPP Draft; R1-091460, 3rd Generation Partnership Project (SGPP), Mobile Competence Centre ; 650, Route Des Lucioles ; F-06921 Sophia-Antipolis Cedex ; France, No. Seoul, Korea; 20090318, Mar. 18, 2009, XP050339027.
Qualcomm Europe, "UL HARQ Feedback for Multicarrier Operation", 3GPP TSG RAN WG1 #58, Shenzhen, China, R1-093122, Aug. 24-28, 2009.
Research in Motion et al: "Blind Decoding for Carrier Aggregation", 3GPP Draft; R1-092416 (RIM-Blind Decoding for CA), 3rd Generation Partnership Project (3GPP), Mobile Competence Centre ; 650, Route Des Lucioles ; F-06921 Sophia-Antipolis Cedex ; France, No. Los Angeles, USA; 20090624, Jun. 24, 2009, XP050350930, [retrieved on Jun. 24, 2009].
Taiwan Search Report—TW099133721—TIPO—Oct. 30, 2013.
ZTE: "Asymmetric band aggregation and anchor carrier ", 3GPP Draft; R1-091701 Asymmetric Bandwidth Aggregation and Anchor Carrier, 3rd Generation Partnership Project (3GPP), Mobile Competence Centre ; 650, Route Des Lucioles ; F-06921 Sophia-Antipolis Cedex; France, No. San Francisco, USA; 20090428, Apr. 28, 2009, XP050339238, [retrieved on Apr. 28, 2009].
ZTE: "Downlink Control Signalling Design for LTE-A" 3GPP Draft; R1-091429 Downlink Control Signalling Design for LTE-A, 3rd Generation Partnership Project (3GPP), Mobile Competence Centre; 650, Route Des Lucioles; F-06921 Sophia-Antipolis Cedex; France, No. Seoul, Korea; 20090317, Mar. 17, 2009, XP050339008 p. 2, paragraph 6.1—p. 3.

* cited by examiner

Cross-Carrier Assignment on Downlink

CARRIER INDICATOR FIELD FOR CROSS CARRIER ASSIGNMENTS

CLAIM OF PRIORITY

The present application claims priority from and is a continuation of U.S. patent application Ser. No. 12/892,282, entitled "CARRIER INDICATOR FIELD FOR CROSS CARRIER ASSIGNMENTS." filed on Sep. 28, 2010, which claims priority from and the benefit of provisional U.S. Application Ser. No. 61/248,632, entitled "CARRIER INDICATOR FIELD FOR CROSS CARRIER ASSIGNMENTS," filed Oct. 5, 2009, the contents of which are incorporated herein by reference in their entirety.

BACKGROUND

I. Field

The present disclosure relates generally to communication, and more specifically to techniques for supporting communication on multiple carriers.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless network may support operation on multiple earners on the downlink and/or uplink. A carrier may refer to a range of frequencies used for communication and may be associated with certain characteristics. A carrier may also be referred to as a channel, a frequency channel, etc. A UE may operate on a carrier or a set of carriers on each link for communication with a base station. The base station may send control information and data on one or more carriers on the downlink to the UE. The UE may send control information and data on one or more carriers on the uplink to the base station. It may be desirable to efficiently support operation on multiple carriers on the downlink and/or uplink.

SUMMARY

Techniques for supporting operation on multiple carriers on the downlink and/or uplink are described herein. In an aspect, a carrier indicator (CI) field may be used to support multi-carrier operation and cross-carrier assignment. For cross-carrier assignment, the CI field may be included in a grant sent on one carrier and may be used to indicate another carrier on which resources are assigned.

In one design, a cell may determine a first carrier on which to send a grant to a UE. The cell may determine a second carrier on which resources are assigned to the UE. The cell may set a CI field of the grant based on the second carrier on which resources are assigned to the UE and a CI mapping for the first carrier. The CI mapping may comprise a plurality of CI values for a plurality of carriers on which resources can be assigned. The cell may set the CI field of the grant to a CI value for (or assigned to) the second carrier. The cell may send the grant to the UE on the first carrier.

In one design, the UE may receive the grant comprising the CI field on the first carrier from the cell. The UE may determine the second carrier on which resources are assigned to the UE based on the CI value in the CI field of the grant and the CI mapping for the first carrier.

In one design, for cross-carrier assignment on the downlink, the first and second carriers may be different downlink carriers. In another design, for cross-carrier assignment on the uplink, the first carrier may be a downlink carrier, and the second carrier may be an uplink carrier that may not be paired with the downlink carrier.

In one design, the CI mapping may be specific for the first carrier. Different earners may be available to send grants and may be associated with different CI mappings. In one design, the CI mapping may be specific for the UE, and different UEs may have different CI mappings for the first carrier. In another design, the CI mapping may be specific for the cell, and different cells may have different CI mappings for the first carrier.

Various aspects and features of the disclosure are described in further detail below.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use EUTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
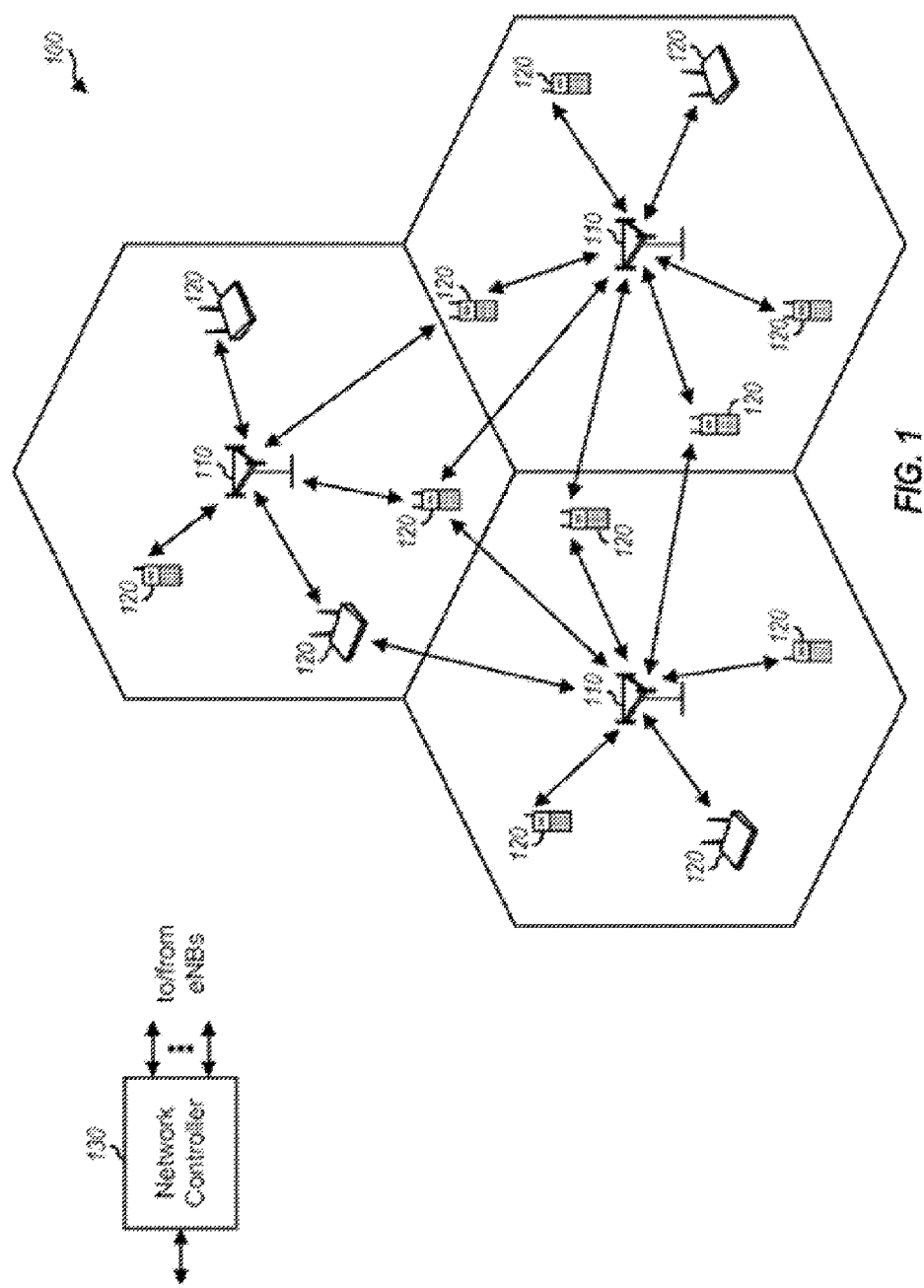
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a Node B, a base station, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for these eNBs. Network controller 130 may comprise a Mobile Management Entity (MME) and/or some other network entity.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Wireless network 100 may support multi-carrier operation, which may refer to operation on multiple carriers on the downlink and/or multiple carriers on the uplink. A carrier used for the downlink may be referred to as a downlink carrier, and a carrier used for the uplink may be referred to as an uplink carrier.

Figure 2:
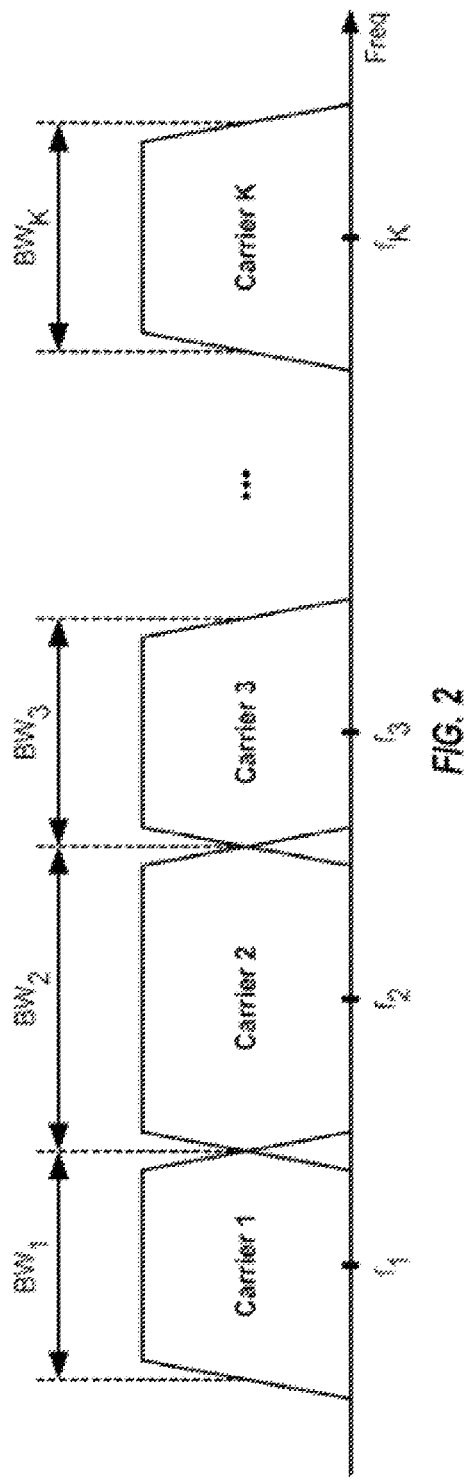
FIG. 2 shows multiple carriers for a communication link.

FIG. 2 shows multiple (K) carriers 1 through K available for a communication link, which may be the downlink or uplink. Carriers 1 through K may be centered at frequencies $f_1$ through $f_K$, respectively, and may have bandwidths of $BW_1$ through $BW_K$, respectively. In general, each carrier may have any bandwidth, and the K carriers may have the same or different bandwidths. System information conveying various attributes (e.g., the center frequency, bandwidth, etc.) of the K carriers may be broadcast to the UEs.

In general, any number of carriers may be supported for the downlink, and any number of carriers may be supported for the uplink. The number of downlink carriers may or may not match the number of uplink carriers. In one design, each uplink carrier may be associated or paired with a specific downlink carrier. In this design, feedback information for data transmission on a given downlink carrier may be sent on the associated uplink carrier, and control information for data transmission on a given uplink carrier may be sent on the associated downlink carrier.

It may be desirable to support operation of a UE on multiple carriers on the downlink and/or uplink, which may be referred to as carrier aggregation. This may allow the UE to receive or transmit data on one or more of the multiple carriers at any given time. It may also be desirable to support cross-carrier assignment on the downlink and/or uplink. For cross-carrier assignment, a grant may be sent to a UE on one carrier to assign resources for data transmission on another carrier. A grant may also be referred to as an assignment, a scheduling message, etc.

Figure 3A:
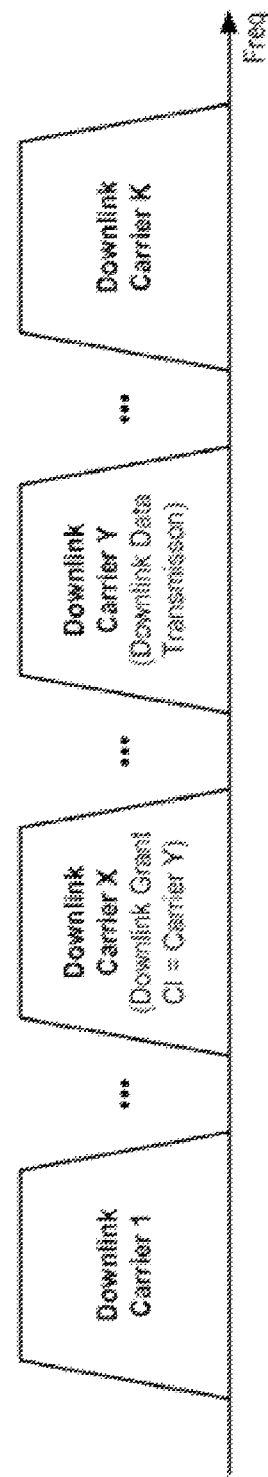
FIG. 3A shows cross-carrier assignment on the downlink.

FIG. 3A shows an example of cross-carrier assignment for the downlink. K downlink carriers 1 through K may be supported, where K>1. A downlink grant may be sent to a UE on one downlink carrier X to assign resources for data transmission on another downlink carrier Y.

Figure 3B:
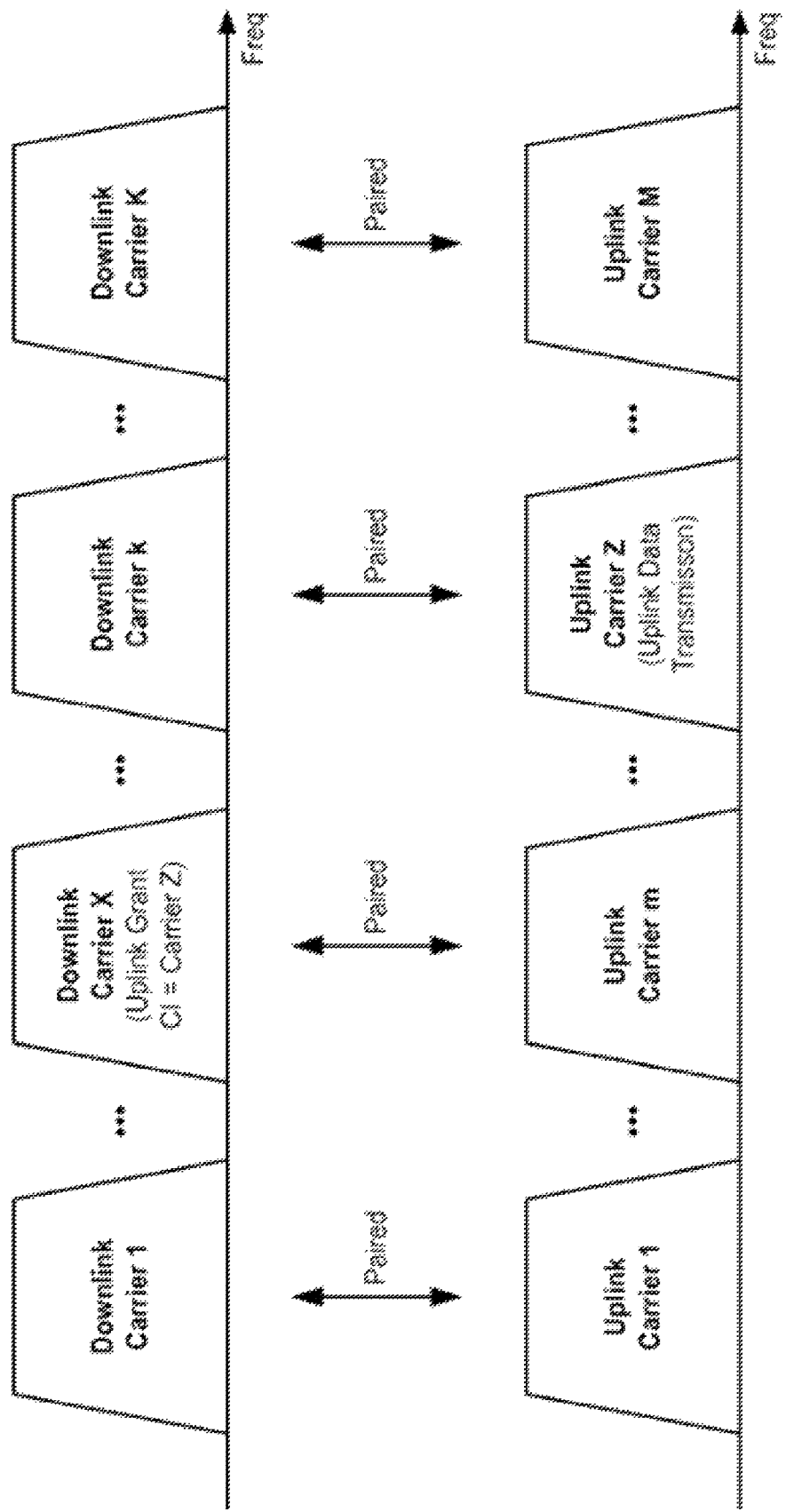
FIG. 3B shows cross-carrier assignment on the uplink.

FIG. 3B shows an example of cross-carrier assignment for the uplink. K downlink carriers 1 through K and M uplink carriers 1 through M may be supported, where K≥1 and M>1. Each uplink carrier may be associated or paired with one downlink carrier. An uplink grant may be sent to a UE on one downlink carrier X to assign resources for data transmission on one uplink carrier Z, which may not be paired with downlink carrier X.

In an aspect, a carrier indicator (CI) field may be used to support multicarrier operation and cross-carrier assignment. In one design, the CI field may be included in a grant and used to indicate a carrier on which resources are assigned to a UE. For cross-carrier assignment, the carrier on which resources are assigned may be different from (i) a downlink carrier on which the grant is sent or (ii) an uplink carrier associated with the downlink carrier on which the grant is sent. For cross-carrier assignment on the downlink, the CI field may be used to indicate a downlink carrier on which resources are assigned. For cross-carrier assignment on the uplink, the CI field may be used to indicate an uplink carrier on which resources are assigned. For clarity, much of the description below is for cross-carrier assignment on the downlink. The CI field may be defined in various manners.

In one design, a carrier-specific CI mapping may be defined for each source carrier. A source carrier is a carrier on which a control message (e.g., a grant) with the CI field may be sent. In general, a source carrier may be a downlink carrier or an uplink carrier. For clarity, much of the description below assumes that a source carrier is a downlink carrier on which grants may be sent to UEs. A CI mapping may also be referred to as a CI table, etc. The CI mapping for each source carrier may specify a target carrier (if any) for each possible value of the CI field (i.e., each possible CI value). A target carrier is a carrier for which a control message (e.g., a grant) applies. For example, if the CI field includes N bits, then up to $2^N$ target carriers may be associated with $2^N$ possible CI values with N bits. In one design, different CI mappings may be defined for different source carriers, and a given CI value may indicate different target carriers in different CI mappings.

Table 1 shows a first example of three CI mappings for three source carriers A, B and C. In this example, the CI field includes one bit (N=1), and there are two possible CI values of 0 and 1. For the CI mapping for source carrier A, a CI value of 0 corresponds to target carrier A, and a CI value of 1 corresponds to target carrier B. For the CI mapping for source carrier B, a CI value of 0 corresponds to target carrier B, and a CI value of 1 corresponds to target carrier A. The CI mapping for carrier B is thus different from the CI mapping for carrier A. For the CI mapping for source carrier C, a CI value of 1 corresponds to target carrier C, and a CI value of 0 is undefined and does not correspond to any carrier. The CI mapping for carrier C is thus different from the CI mappings for carriers A and B. Table 1 also illustrates the same CI value being assigned to different target carriers in different CI mappings. For example, a CI value of 1 corresponds to carrier B in the CI mapping for carrier A, corresponds to carrier A in the CI mapping for carrier B, and corresponds to carrier C in the CI mapping for carrier C.

TABLE 1

First Example of CI Mappings for Carriers A, B and C

| CI Mapping for Carrier A | | CI Mapping for Carrier B | | CI Mapping for Carrier C | |
|---|---|---|---|---|---|
| CI = 0 | Carrier A | CI = 0 | Carrier B | CI = 0 | — |
| CI = 1 | Carrier B | CI = 1 | Carrier A | CI = 1 | Carrier C |

Cross-carrier assignment may provide flexibility in sending grants to UEs but may also increase decoding complexity at the UEs. A grant may be sent to a UE on carrier X and may assign resources on another carrier Y to the UE. Carrier X may be the source carrier, and carrier Y may be the target carrier. The grant may be sent in a manner that may be dependent on the bandwidth of carrier X and/or the bandwidth of carrier Y. For example, the grant may have a length that may be dependent on the bandwidth of carrier Y and possibly other factors.

The UE would typically not know on which earner the resources are assigned by the grant. The UE may then perform blind decoding for each possible target carrier on which resources can be assigned by a grant sent on carrier X. The number of blind decodes performed by the UE may be dependent on the number of target carriers with different bandwidths included in the CI mapping for carrier X. For example, carriers X and Y may be included in the CI mapping for carrier X, carrier X may have a bandwidth of 5 MHz, and carrier Y may have a bandwidth of 10 MHz. A downlink control information (DCI) format of a grant for a 5 MHz carrier may be different from a DCI format of a grant for a 10 MHz carrier. Hence, the UE may consider two hypotheses corresponding to 5 MHz and 10 MHz bandwidths for decoding a grant received on carrier X. More target carriers with different bandwidths in a CI mapping may thus increase UE complexity and/or degrade performance.

The target carriers associated with each source carrier may be selected to reduce UE complexity. In one design, each source carrier may be associated with one or more target carriers having the same bandwidth as the source carrier. For the example shown in Table 1, carriers A and B may have the same bandwidth, and carrier C may have a different bandwidth. By not including carrier C in the CI mappings for carriers A and B (or equivalently, by preventing cross-carrier assignment from carriers A and B to carrier C), the number of hypotheses for decoding a grant sent on carrier A, B, or C may be reduced. In another design, each source carrier may be associated with target carriers having a small number of (e.g., two or three) different bandwidths m order to reduce the number of decoding hypotheses.

Regardless of how the CI mappings may be defined, the UE would know the CI mappings for different source carriers. The UE may use the CI mapping for each source carrier to interpret assignment of resources. For example, the UE may receive a grant with a CI value of Q on carrier X. The UE may look up the CI mapping for carrier X and may determine that carrier Z corresponds to the CI value of Q. The UE can then determine that the grant is for resources on carrier Z.

It may be desirable to limit the number of bits used for the CI field in order to reduce signaling overhead. For example, the CI field may be limited to 1, 2, or 3 bits. The number of possible CI values ($2^N$) is dependent on the number of bits (N) used for the CI field. For example, if two bits are used for the CI field, then four possible CI values would be available and may be assigned to up to four target carriers. It may be desirable to support more than $2^N$ target carriers with N bits for the CI field.

In one design, more than $2^N$ target carriers may be supported with N bits for the CI field by selecting a group of up to $2^N$ target carriers for each source carrier. The CI mapping for each source carrier may then be defined for the group of target carriers associated with that source carrier. Different groups of target carriers may be associated with different source carriers. Each group may include $2^N$ or fewer target carriers, and all groups may collectively include all target carriers.

Table 2 shows an example of supporting more than $2^N$ target carriers with N bits of the CI field. In this example, the CI field includes two bits for four possible CI values (which are given in hexadecimal in Table 2), and five target carriers A through E are supported. Table 2 shows three CI mappings for three source carriers A, B and C. In the example shown in Table 2, source carrier A is associated with target carriers A, B, C and D, source carrier B is associated with target carriers B, C, D and E, and source carrier C is also associated with target carriers B, C, D and E. Source carriers A and B are associated with different groups of target carriers. Hence, different CI mappings are defined for source carriers A and B in order to support the different groups of target carriers. The interpretation of CI values is then different for source carriers A and B. Source carriers B and C are associated with the same group of target carriers. The same CI mapping may be defined for source earners B and C (not shown in Table 2). Alternatively, different CI mappings may be defined for source carriers B and C (as shown in Table 2).

TABLE 2

Second Example of CI Mappings for Carriers A, B and C

| CI Mapping for Carrier A | | CI Mapping for Carrier B | | CI Mapping for Carrier C | |
|---|---|---|---|---|---|
| CI = 00 | Carrier A | CI = 00 | Carrier B | CI = 00 | Carrier C |
| CI = 01 | Carrier B | CI = 01 | Carrier C | CI = 01 | Carrier B |
| CI = 10 | Carrier C | CI = 10 | Carrier D | CI = 10 | Carrier D |
| CI = 11 | Carrier D | CI = 11 | Carrier E | CI = 11 | Carrier E |

In general, any number of target carriers may be supported with N bits of the CI field. The source carriers may be associated with overlapping groups of target carriers (e.g., as shown in Table 2) or non-overlapping groups of target sub-carriers. For example, eight target carriers A through H may be supported, a first group of four target carriers A through D may be associated with four CI values 00 through 11 (hexadecimal) in a first CI mapping for a first source carrier, and a second group of four target carriers E through H may be associated with four CI values 00 through 11 (hexadecimal) in a second CI mapping for a second source carrier. Grants may then be sent to a UE on different source carriers depending on the carriers on which resources are assigned to the UE. Limiting the target carriers associated with each source carrier to a subset of all target carriers may reduce the number of blind decodes to perform by a UE for each source carrier (e.g., if different carriers have different bandwidths).

Tables 1 and 2 show two examples of CI mappings for different source earners. In general, the CI mappings for different source carriers may be defined in various manners. In one design, the CI mappings for different source carriers may be specified in a standard and may be fixed. In another design, the CI mappings for different source carriers may be defined by a wireless network (e.g., a designated network entity or a network operator) and may be configurable. In one design, the CI mappings for different source carriers may be common for all UEs served by a cell and may be broadcast to the UEs. In another design, the CI mappings for different source carriers may be specific to each UE and may be signaled to the UE.

A group of one or more target carriers may be associated with each source carrier and may be selected in various manners and based on various criteria. In one design, the target carrier(s) associated with each source carrier may be selected based on the bandwidth of each carrier. A grant may be sent in different manners (e.g., on different numbers of control channel elements (CCEs)) depending on the bandwidth of a source carrier on which the grant is sent and/or the bandwidth of a target carrier on which resources are assigned. Each source carrier may then be associated with target carrier(s) having the same bandwidth as the source carrier in order to reduce decoding complexity at the UEs.

In another design, the target carrier(s) associated with each source carrier may be selected based on a transmission mode configured for a UE on each carrier. A number of transmission modes may be supported by the wireless network. Each transmission mode may specify how data is transmitted. Each transmission mode may also be associated with a set of DCI formats that may be used to send grants for data transmission based on that transmission mode. The UE may be configured with a particular transmission mode on a carrier and may perform blind decoding for all DCI formats associated with the transmission mode configured for the UE on the carrier. For each source carrier associated with one or more target carriers, the UE may perform blind decoding for all DCI formats associated with all transmission modes configured for the UE on all target carriers associated with that source carrier. For example, the UE may be configured with transmission mode 1 on target carrier X and transmission mode 2 on target carrier Y. If source carrier A is associated with target carriers X and Y, then the UE may perform blind decoding for source carrier A for all DCI formats associated with transmission modes 1 and 2, which are configured for the UE on target carriers X and Y associated with source carrier A. In one design, to reduce the number of blind decodes, target carriers on which the UE is configured with the same transmission mode may be grouped together. For example, source carrier A may be associated with a group of target carriers on which the UE is configured for transmission mode 1, source carrier B may be associated with a group of target carriers on which the UE is configured for transmission mode 2, etc. The UE may then perform blind decoding for one set of DCI formats for source carrier A, perform blind decoding for another set of DCI formats for source carrier B, etc.

The target carrier(s) associated with each source carrier may also be selected based on other criteria. The target carrier(s) may be selected to reduce decoding complexity of the UEs, etc. A CI mapping may be defined for each source carrier based on the target carrier(s) associated with that source carrier.

The CI mappings for different source carriers may be defined and conveyed in various manners. In a first design, a CI mapping may be defined for each source carrier and may include a target carrier (if any) for each possible CI value. For the example shown in Table 2, the CI mapping for source carrier A may indicate that carrier A is assigned CI value 00 (hexadecimal), carrier B is assigned CI value 01, carrier C is assigned CI value 10, and carrier D is assigned CI value 11. For the first design, the number of bits used to convey each target carrier may be dependent on the total number of target carriers. For the example shown in Table 2, five target carriers may be supported, and each target carrier may be conveyed by a 3-bit value. The CI mapping for each source carrier may then be conveyed by four 3-bit values for the four target carriers that are assigned the four possible CI values. The first design may provide total flexibility in defining the CI mapping for each source carrier.

In a second design, the CI mappings for different source carriers may be defined based on a common definition of CI values. In this design, up to $2^N$ target carriers may be supported with N bits for the CI field. Each of the $2^N$ possible CI values may be assigned to a specific target carrier. The CI mapping for each source carrier may then be defined based on this common definition of CI values. For example, four target carriers A, B, C and D may be supported with two bits for the CI field, as shown in Table 3. Carrier A may be assigned CI value 00 (hexadecimal), carrier B may be assigned CI value 01, carrier C may be assigned CI value 10, and carrier D may be assigned CI value 11. This common definition of CI values may be applicable for all source carriers.

TABLE 3

| Common CI Definition | | CI Mapping for Carrier A | CI Mapping for Carrier B | CI Mapping for Carrier C |
| --- | --- | --- | --- | --- |
| CI = 00 | Carrier A | YES | NO | YES |
| CI = 01 | Carrier B | YES | YES | NO |
| CI = 10 | Carrier C | NO | YES | YES |
| CI = 11 | Carrier D | NO | NO | NO |

In one design, the CI mapping for each source carrier may comprise a bitmap defined based on the common definition of CI values. The bitmap for a given source carrier may include $2^N$ bits for up to $2^N$ target carriers associated with the $2^N$ possible CI values. For the example shown in Table 3, the bitmap may include four bits for four possible CI values of 00 through 11. The first bit in the bitmap may correspond to carrier A assigned CI value 00, the second bit may correspond to carrier B assigned CI value 01, the third bit may correspond to carrier C assigned CI value 10, and the fourth bit may correspond to carrier D assigned CI value 11. The n-th bit in the bitmap may be set to (i) a first value (e.g., 1) to indicate that the corresponding target carrier is associated with the source carrier or (ii) a second value (e.g., 0) to indicate that the corresponding target carrier is not associated with the source carrier. For the example shown in Table 3, three bitmaps for source carriers A, B and C may be defined as follows:

Bitmap for source carrier A: (1 1 0 0)
Bitmap for source carrier B: (0 1 1 0)
Bitmap for source carrier C: (1 0 1 0).

In the example above, the four bits in each bitmap correspond to carriers A, B, C and D. The bitmap for source carrier A indicates that carriers A and B are associated with source carrier A. The bitmap for source carrier B indicates that carriers B and C are associated with source carrier B. The bitmap for source carrier C indicates that carriers A and C are associated with source carrier C.

In another design, the CI mapping for each source carrier may comprise a list of target carriers that are associated with that source carrier, with the target carriers being defined based on the common definition of CI values. For the example shown in Table 3, three lists for source carriers A, B and C may be defined as follows:

List for source carrier A: (00), (0 1)
List for source carrier B: (01), (10)
List for source carrier C: (00), (10).

In the example above, the four possible target carriers A, B, C and D may be assigned CI values as shown in the first two columns of Table 3. The list for source carrier A indicates that carrier A with CI value of 00 (hexadecimal) and carrier B with CI value of 01 are both associated with source carrier A. The list for source carrier B indicates that carrier B with CI value of 01 and carrier C with CI value of 10 are both associated with source carrier B. The list for source carrier C indicates that carrier A with CI value of 00 and carrier C with CI value of 10 are both associated with source carrier C.

In yet another design, the CI mapping for each source carrier may comprise a list of target carriers that are not associated with that source carrier, with the target carriers being defined based on the common definition of CI values. This design may reduce signaling overhead if the number of target carriers not associated with the source carriers is fewer than the number of target carriers associated with the source carriers.

The second design may have lower signaling overhead than the first design. The common definition of CI values may be (i) defined by a network entity and explicitly signaled to a UE or (ii) known a priori by the UE and not signaled. For example, the common CI definition may be based on the order in which target carriers are configured, and target carriers with progressively higher indices may be assigned progressively higher CI values. The CI mapping for each source carrier may then be given by a bitmap or a list of target carriers. Since the common CI definition is used for all source carriers, the second design may support up to $2^N$ target carriers with N bits for the CI field.

The CI mappings for different source carriers may also be defined and conveyed in other manners. Different CI mappings may be defined for different source carriers. Different CI mappings may also be defined for different UEs. Different CI mappings may also be defined for cross-carrier assignment on the downlink and cross-carrier assignment on the uplink. These features may provide flexibility in configuring each UE and may also limit the number of CI options that each UE can expect for each source earner.

In one design, a downlink grant or an uplink grant may be sent for each carrier on which a UE is scheduled for data transmission. A grant may be sent based on a DCI format for a single carrier and may include a CI field to indicate a carrier on which the UE is scheduled. The CI field may be used to support cross-carrier assignment, as described above. The CI field may also be used to support asymmetric downlink and uplink (DL/UL) configurations in which the number of downlink carriers is not equal to the number of uplink carriers. For example, the CI field may be used to support an asymmetric DL/UL configuration with one downlink carrier and multiple uplink carriers.

In one design, the CI field may be included in each grant and may indicate a carrier on which resources are assigned, as described above. In another design, the CI field may or may not be included in a grant. If the CI field is not included, then the grant may be for resources on a downlink carrier on which the grant is sent (for a downlink grant) or an uplink carrier uniquely associated with the downlink carrier (for an uplink grant). The CI field may be omitted in certain operating scenarios such as in a homogeneous network deployment with a single type of eNBs (e.g., macro eNBs), or a symmetric DL/UL carrier configuration with equal number of downlink carriers and uplink carriers, or when the number of downlink carriers is larger than the number of uplink carriers. The CI field may be included in other operating scenarios such as in a heterogeneous network deployment with different types of eNBs, or an asymmetric DL/UL carrier configuration (at least for the case when one downlink carrier is paired with multiple uplink carriers), or for cross-carrier assignment. Cross-carrier assignment may be used to improve control reliability and to enable inter-cell interference coordination (ICIC).

In general, the CI mapping for each source carrier may be defined in any manner and may be known to both a scheduler in a wireless network and a UE. The scheduler and the UE can then have the same interpretation of a CI value in the CI field of a grant sent to the UE.

The number of bits for the CI field (i.e., the number of CI bits) may be determined in various manners. In one design, the number of CI bits may be configurable and may be equal to one, two, three, or some other number of bits. The number of CI bits may be dependent on the number of carriers available for data transmission. In one design, the number of CI bits may be configured for a UE and provided by higher layer signaling. The number of CI bits may be determined based on (i) a physical downlink shared channel (PDSCH) set used for data transmission on the downlink and/or (ii) a physical uplink shared channel (PUSCH) set used for data transmission on the uplink. In another design, the number of CI bits may be specific for a cell and may be determined based on the carrier configuration of the cell. In this design, a UE may determine how many CI bits to expect in a downlink grant based on the number of downlink carriers configured for data transmission on the downlink. The UE may determine how many CI bits to expect in an uplink grant based on the number of uplink carriers configured for data transmission on the uplink.

For all designs described above, the number of CI bits in a downlink grant may or may not be equal to the number of CI bits in an uplink grant. The number of CI bits for each link may be dependent on (i) whether or not cross-carrier assignment is supported for that link and (ii) the number of carriers available for the link. The number of CI bits for the downlink and the number of CI bits for the uplink may be conveyed to a UE if they are different.

A configurable number of CI bits may be defined for each of the downlink and uplink based on any of the designs described above. For example, one, two, or three CI bits may be used for each link and may be signaled to a UE. The configurable number of CI bits may reduce overhead for the CI field at the expense of greater complexity. In another design, a fixed number of CI bits may be used for each link in which cross-carrier assignment is supported. A single bit may be signaled to a UE for each link to indicate whether or not cross-carrier assignment is supported on that link. The UE may assume (i) a predetermined number of CI bits (e.g., three CI bits) in each grant sent to the UE with cross-carrier assignment or (ii) no CI bits in each grant sent to the UE without cross-carrier assignment.

Figures 4, 5:
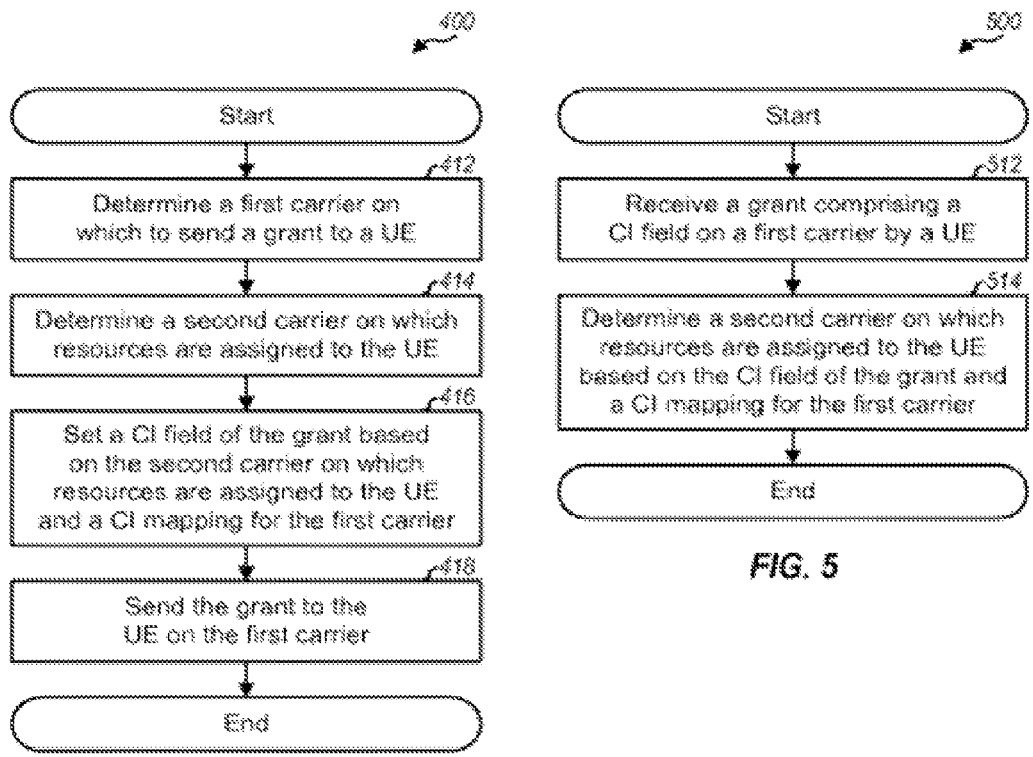
FIG. 4 shows a process for sending a grant in a wireless network.
FIG. 5 shows a process for receiving a grant in a wireless network.

FIG. 4 shows a design of a process 400 for sending grants in a wireless network. Process 400 may be performed by a cell (as described below) or by some other entity. The cell may determine a first carrier on which to send a grant to a UE (block 412). The cell may determine a second carrier on which resources are assigned to the UE (block 414). The cell may set a CI field of the grant based on the second carrier on which resources are assigned to the UE and a CI mapping for the first carrier (block 416). In one design, the CI mapping may comprise a plurality of CI values for a plurality of target carriers on which resources can be assigned. The cell may set the CI field of the grant to a CI value for (or assigned to) the second carrier. The cell may send the grant to the UE on the first carrier (block 418).

In one design, the CI mapping may be specific for the first carrier. A plurality of source carriers including the first carrier may be available to send grants and may be associated with a plurality of CI mappings, one CI mapping for each source carrier. Different source carriers may be associated with different CI mappings. In another design, the CI mapping may be applicable for the plurality of source carriers.

In one design, the CI mapping for the first carrier may be specific for the UE, and different UEs can have different CI mappings for the first carrier. In another design, the CI mapping for the first carrier may be specific for the cell, and different cells can have different CI mappings for the first carrier. The cell may send signaling conveying the CI mapping for the first carrier. The cell may send the signaling specifically to the UE (e.g., for a DE-specific CI mapping) or may broadcast the signaling to all UEs (e.g., for a cell-specific CI mapping).

In one design, a plurality of downlink carriers may be available to send downlink grants and may be associated with a plurality of CI mappings, one CI mapping for each downlink carrier. In this design, the CI mapping for each downlink carrier may indicate at least one downlink carrier on which resources can be assigned by downlink grants sent on the downlink carrier. In another design, a plurality of downlink carriers may be available to send uplink grants and may be associated with a plurality of CI mappings, one CI mapping for each downlink carrier. In this design, the CI mapping for each downlink carrier may indicate at least one uplink carrier on which resources can be assigned by uplink grants sent on the downlink carrier.

The cell may determine a third carrier on which to send a second grant to the UE. The cell may determine a fourth carrier on which resources are assigned to the UE. The cell may set the CI field of the second grant based on the fourth carrier on which resources are assigned to the UE and a second CI mapping for the third carrier. The cell may send the second grant to the UE on the third carrier. The CI mapping for the first carrier may cover a first group of at least one target carrier, which may include the second carrier. The second CI mapping for the third carrier may cover a second group of at least one target carrier, which may include the fourth carrier. The first group of target carrier(s) may be different from the second group of target carrier(s). The first and second groups may also include the same or different numbers of target carriers.

FIG. 5 shows a design of a process 500 for receiving grants in a wireless network. Process 500 may be performed by a UE (as described below) or by some other entity. The UE may receive a grant comprising a CI field on a first carrier (block 512). The UE may determine a second carrier on which resources are assigned to the UE based on the CI field of the grant and a CI mapping for the first carrier (block 514). In one design, the CI mapping may comprise a plurality of CI values for a plurality of target carriers on which resources can be assigned. The UE may determine the second carrier based on a CI value in the CI field of the grant.

In one design, the CI mapping may be specific for the first carrier. A plurality of source carriers including the first carrier may be available to send grants and may be associated with a plurality of CI mappings, one CI mapping for each source carrier. Different source carriers can be associated with different CI mappings. In one design, the CI mapping for each source carrier may cover a subset of a plurality of target carriers on which resources can be assigned. This design may allow more than $2^N$ target carriers to be covered by a CI mapping with only N bits for the CI field, e.g., as shown in Table 2. In another design, the CI mapping for each source carrier may cover all or a subset of the plurality of target carriers.

In one design, the CI mapping for each source carrier may cover at least one target carrier having the same bandwidth. In another design, the CI mapping for each source carrier may cover at least one target carrier for which the UE is configured with the same transmission mode. The UE may be configured with one of a plurality of transmission modes for each of the plurality of target carriers on which resources can be assigned. In yet another design, the CI mapping for each source carrier may cover at least one target carrier for which the UE has the same grant size. The UE may have a particular grant size for each of the plurality of target carriers on which resources can be assigned. The grant size for each target carrier may be determined based on the bandwidth of the target carrier, the transmission mode configured for the UE on the target carrier, and/or other factors. These designs may reduce decoding complexity of the UE.

In one design, the CI mapping for the first carrier may be specific for the UE, and different UEs can have different CI mappings for the first carrier. In another design, the CI mapping for the first carrier may be specific for a cell sending the grant to the UE, and different cells can have different CI mappings for the first carrier.

In one design, the CI mapping may be for the downlink. The grant may comprise a downlink grant assigning resources to the UE for data transmission on downlink. The first and second carriers may be different downlink carriers for cross-carrier assignment on the downlink. In another design, the CI mapping may be for the uplink. The grant may comprise an uplink grant assigning resources to the UE for data transmission on uplink. The first carrier may be a downlink carrier, and the second earner may be an uplink earner. The uplink carrier may not be paired with the downlink carrier for cross-carrier assignment on the uplink.

In one design, the UE may receive a second grant comprising the CI field on a third carrier. The UE may determine a fourth carrier on which resources are assigned to the UE based on the CI field of the second grant and a second CI mapping for the third carrier. The CI mapping for the first carrier may cover a first group of at least one target carrier including the second carrier. The second CI mapping for the third carrier may cover a second group of at least one target carrier including the fourth carrier. The first group of target carrier(s) may be different from the second group of target carrier(s). The first and second groups may include the same or different numbers of target carriers.

In one design, the UE may receive signaling conveying the CI mapping for the first carrier. In one design, the CI mapping may comprise a plurality of CI values for a plurality of target carriers on which resources can be assigned. The signaling may convey a target carrier for each CI value. In another design, the signaling may convey a bitmap for the CI mapping. The bitmap may indicate whether each of a plurality of target carriers is included in the CI mapping. In yet another design, the signaling may convey a list of target carriers included in the CI mapping. The CI mapping may also be signaled in other manners.

Figure 6:
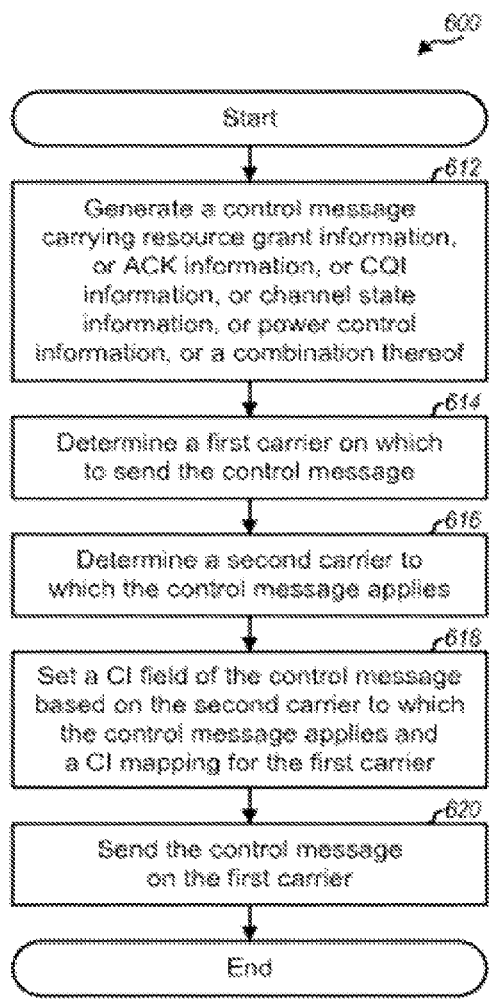
FIG. 6 shows a process for sending a control message in a wireless network.

FIG. 6 shows a design of a process 600 for sending control messages in a wireless network. Process 600 may be performed by a cell (as described below) or by some other entity. The cell may generate a control message carrying resource grant information, or ACK information, or CQI information, or channel state information, or power control information, or some other information, or a combination thereof (block 612). The cell may determine a first carrier on which to send the control message (block 614). The cell may determine a second carrier to which the control message applies (block 616). The cell may set a CI field of the control message based on the second carrier to which the control message applies and a CI mapping for the first carrier (block 618). The cell may send the control message on the first carrier (block 620).

In one design, the CI mapping may be specific for the first carrier. A plurality of source carriers may be available to send control messages and may be associated with a plurality of CI mappings, one CI mapping for each source carrier. Different source carriers can be associated with different CI mappings. In one design, the CI mapping may be specific for a UE to which the control message is sent, and different UEs can have different CI mappings for the first carrier. In another design, the CI mapping may be specific for the cell sending the control message, and different cells can have different CI mappings for the first carrier.

Figure 7:
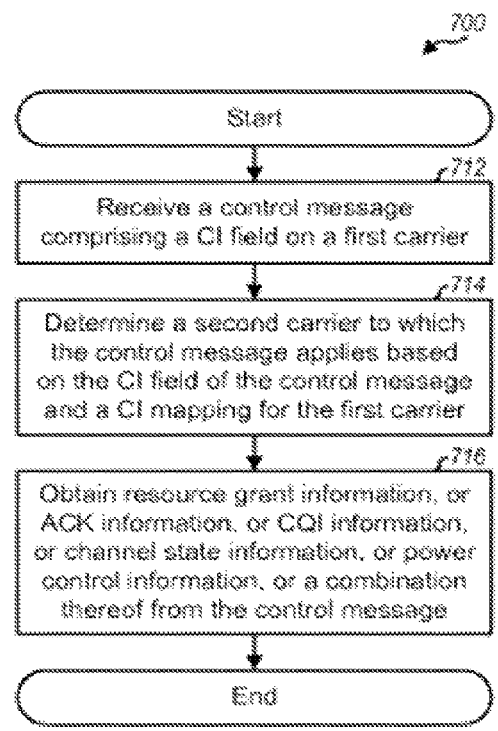
FIG. 7 shows a process for receiving a control message in a wireless network.

FIG. 7 shows a design of a process 700 for receiving control messages in a wireless network. Process 700 may be performed by a UE (as described below) or by some other entity. The UE may receive a control message comprising a CI field on a first carrier (block 712). The UE may determine a second carrier on which the control message applies based on the CI field of the control message and a CI mapping for the first carrier (block 714). The UE may obtain resource grant information, or ACK information, or CQI information, or channel state information, or power control information, or some other information, or a combination thereof from the control message (block 716).

In one design, the CI mapping may be specific for the first carrier. In one design, the CI mapping may be specific for the UE. In another design, the CI mapping may be specific for a cell sending the control message.

Figure 8:
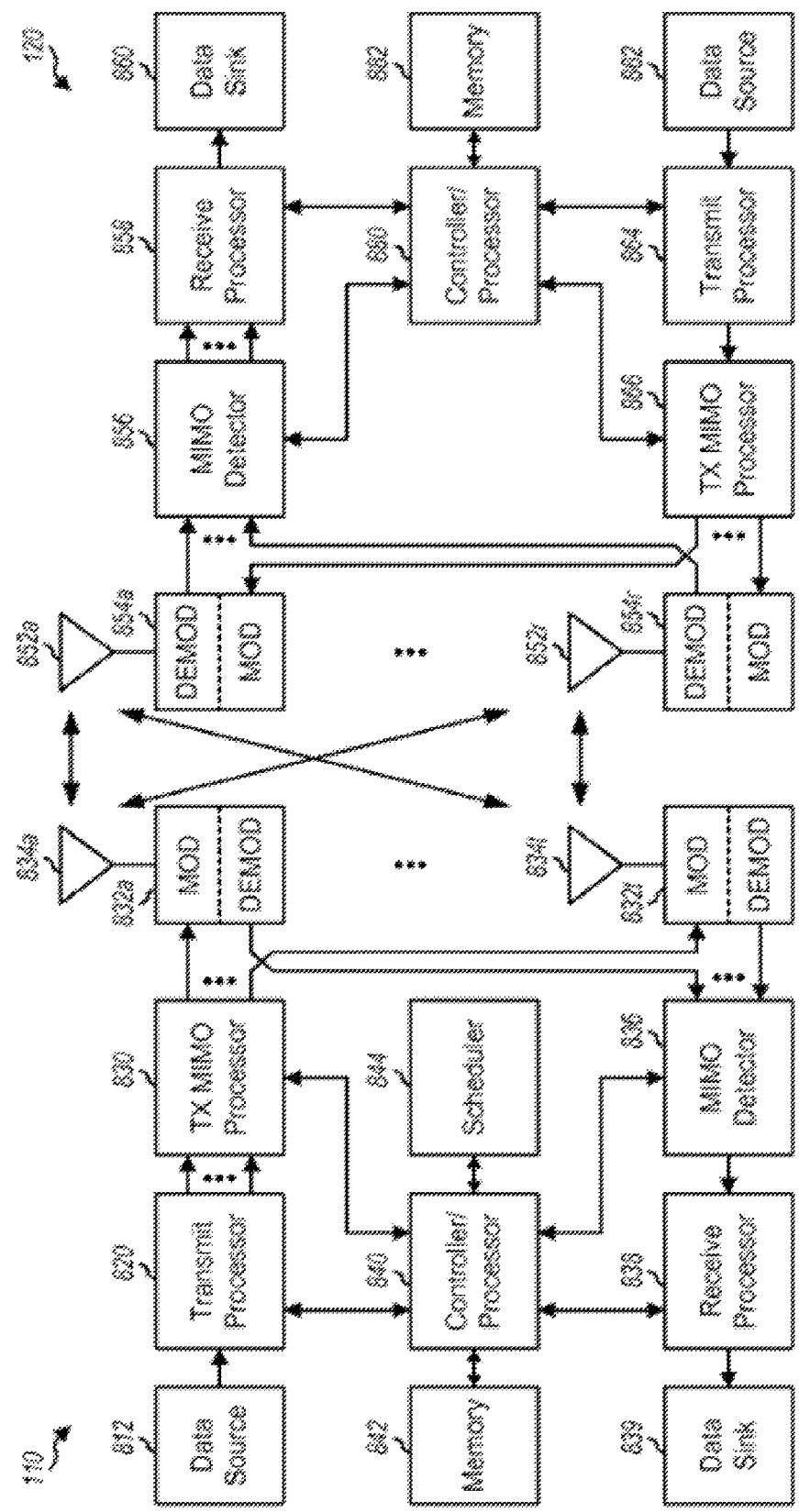
FIG. 8 shows a block diagram of a base station and a UE.

FIG. 8 shows a block diagram of a design of base station/eNB 110 and UE 120, which may be one of the base stations/eNBs and one of the UEs in FIG. 1. Base station 110 may be equipped with T antennas 834a through 834t, and UE 120 may be equipped with R antennas 852a through 852r, where in general T≥1 and R≥1.

At base station 110, a transmit processor 820 may receive data from a data source 812 for one or more UEs, process (e.g., encode and modulate) the data for each UE based on one or more modulation and coding schemes selected for that UE, and provide data symbols for all UEs. Transmit processor 820 may also process control information (e.g., for downlink grants, uplink grants, control messages, CI mappings, etc.) and provide control symbols. Processor 820 may also generate reference symbols for reference signals. A transmit (TX) multiple-input multiple-output (MIMO) processor 830 may perform spatial processing (e.g., precoding) on the data symbols, the control symbols, and/or the reference symbols, if applicable, and may provide T output symbol streams toT modulators (MODs) 832a through 832t. Each modulator 832 may process a respective output symbol stream (e.g., for OFDM, etc.) to obtain an output sample stream. Each modulator 832 may further process (e.g., convert to analog, amplify, filter, and upconvert) the output sample stream to obtain a downlink signal. T downlink signals from modulators 832a through 832t may be transmitted via T antennas 834a through 834t, respectively.

At UE 120, antennas 852a through 852r may receive the downlink signals from base station 110 and/or other base stations and may provide received signals to demodulators (DEMODs) 854a through 854r, respectively. Each demodulator 854 may condition (e.g., filter, amplify, downconvert, and digitize) its received signal to obtain input samples. Each demodulator 854 may further process the input samples (e.g., for OFDM, etc.) to obtain received symbols. A MIMO detector 856 may obtain received symbols from all R demodulators 854a through 854r, perform MIMO detection on the received symbols if applicable, and provide detected symbols. A receive processor 858 may process (e.g., demodulate and decode) the detected symbols, provide decoded data for UE 120 to a data sink 860, and provide decoded control information to a controller/processor 880.

On the uplink, at UE 120, a transmit processor 864 may receive and process data from a data source 862 and control information from controller/processor 880. Processor 864 may also generate reference symbols for one or more reference signals. The symbols from transmit processor 864 may be precoded by a TX MIMO processor 866 if applicable, further processed by modulators 854a through 854r (e.g., for SC-FDM, OFDM, etc.), and transmitted to base station 110. At base station 110, the uplink signals from UE 120 and other UEs may be received by antennas 834, processed by demodulators 832, detected by a MIMO detector 836 if applicable, and further processed by a receive processor 838 to obtain decoded data and control information sent by UE 120. Processor 838 may provide the decoded data to a data sink 839 and the decoded control information to controller/processor 840.

Controllers/processors 840 and 880 may direct the operation at base station 110 and UE 120, respectively. Processor 840 and/or other processors and modules at base station 110 may perform or direct process 400 in FIG. 4, process 600 in FIG. 6, and/or other processes for the techniques described herein. Processor 880 and/or other processors and modules at UE 120 may perform or direct process 500 in FIG. 5, process 700 in FIG. 7, and/or other processes for the techniques described herein. Memories 842 and 882 may store data and program codes for base station 110 and UE 120, respectively. A scheduler 844 may schedule UEs for data transmission on the downlink and/or uplink and may assign resources to the scheduled UEs.

In one configuration, apparatus 110 for wireless communication may include means for determining a first carrier on which to send a grant to a UE, means for determining a second carrier on which resources are assigned to the UE, means for setting a CI field of the grant based on the second carrier on which resources are assigned to the UE and a CI mapping for the first carrier, and means for sending the grant to the UE on the first carrier.

In another configuration, apparatus 120 for wireless communication may include means for receiving a grant comprising a CI field on a first carrier by a UE, and means for determining a second carrier on which resources are assigned to the UE based on the CI field of the grant and a CI mapping for the first carrier.

In yet another configuration, apparatus 110 for wireless communication may include means for generating a control message carrying resource grant information, or ACK information, or CQI information, or channel state information, or power control information, or some other information, or a combination thereof, means for determining a first carrier on which to send the control message, means for determining a second carrier to which the control message applies, means for setting a CI field of the control message based on the second carrier to which the control message applies and a CI mapping for the first carrier, and means for sending the control message on the first earner.

In yet another configuration, apparatus 120 for wireless communication may include means for receiving a control message comprising a CI field on a first carrier, means for determining a second carrier to which the control message applies based on the CI field of the control message and a CI mapping for the first carrier, and means for obtaining resource grant information, or ACK information, or CQI information, or channel state information, or power control information, or some other information, or a combination thereof from the control message.

In an aspect, the aforementioned means may be processor(s) 820, 838 and/or 840 at base station 110 and/or processors(s) 858, 864 and/or 880 at UE 120, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a first carrier on which to send a grant to a user equipment (UE);
   determining a second carrier on which resources are assigned to the UE based on a carrier indicator (CI) mapping for the first carrier, wherein the CI mapping for the first carrier is specific to the UE, and wherein the CI mapping maps the first carrier to one or more additional carriers;
   setting a CI field of the grant based on the second carrier and the CI mapping for the first carrier; and
   sending the grant to the UE on the first carrier.

2. The method of claim 1, wherein different UEs have different UE specific CI mappings for the first carrier.

3. The method of claim 1, wherein the CI mapping comprises a plurality of CI values for a plurality of target carriers on which resources are assigned, and wherein the setting the CI field of the grant comprises setting the CI field of the grant to a CI value for the second carrier.

4. The method of claim 1, wherein the method includes sending signaling conveying the CI mapping for the first carrier.

5. The method of claim 4, wherein the signaling is broadcast to the UE.

6. The method of claim 4, wherein the signaling is sent specifically to the UE.

7. The method of claim 1, wherein the first carrier and the second carrier are downlink carriers.

8. The method of claim 1, wherein the first carrier is a downlink carrier and the second carrier is an uplink carrier.

9. The method of claim 1, wherein the method includes:
determining a third carrier on which to send a second grant to the UE;
determining a fourth carrier on which resources are assigned to the UE;
setting the CI field of the second grant based on the fourth carrier on which resources are assigned to the UE and a second CI mapping for the third carrier; and
sending the second grant to the UE on the third carrier.

10. The method of claim 9, wherein the CI mapping for the first carrier covers a first group of at least one target carrier including the second carrier, wherein the second CI mapping for the third carrier covers a second group of at least one target carrier including the fourth carrier, and wherein the first group of at least one target carrier is different from the second group of at least one target carrier.

11. The method of claim 1, wherein a plurality of source carriers are allocated to the UE, and wherein the plurality of source carriers includes the first carrier.

12. The method of claim 11, wherein the CI mapping covers a plurality of target carriers on which resources are assigned, each target carrier of the plurality of target carriers associated with one of the plurality of source carriers.

13. An apparatus for wireless communication, comprising:
at least one processor; and
a memory coupled to the at least one processor,
wherein the at least one processor is configured to:
determine a first carrier on which to send a grant to a user equipment (UE);
determine a second carrier on which resources are assigned to the UE based on a carrier indicator (CI) mapping for the first carrier, wherein the CI mapping for the first carrier is specific to the UE, and wherein the CI mapping maps the first carrier to one or more additional carriers;
set a CI field of the grant based on the second carrier and the CI mapping for the first carrier; and
send the grant to the UE on the first carrier.

14. The apparatus of claim 13, wherein different UEs have different UE specific CI mappings for the first carrier.

15. The apparatus of claim 13, wherein the CI mapping comprises a plurality of CI values for a plurality of target carriers on which resources are assigned, and wherein the setting the CI field of the grant includes setting the CI field of the grant to a CI value for the second carrier.

16. The apparatus of claim 13, wherein the at least one processor is configured to send signaling conveying the CI mapping for the first carrier.

17. The apparatus of claim 16, wherein the signaling is broadcast to the UE.

18. The apparatus of claim 16, wherein the signaling is sent specifically to the UE.

19. The apparatus of claim 13, wherein the first carrier and the second carrier are downlink carriers.

20. The apparatus of claim 13, wherein the first carrier is a downlink carrier and the second carrier is an uplink carrier.

21. The apparatus of claim 13, wherein the at least one processor is configured to:
determine a third carrier on which to send a second grant to the UE;
determine a fourth carrier on which resources are assigned to the UE;
set the CI field of the second grant based on the fourth carrier on which resources are assigned to the UE and a second CI mapping for the third carrier; and
send the second grant to the UE on the third carrier.

22. The apparatus of claim 21, wherein the CI mapping for the first carrier covers a first group of at least one target carrier including the second carrier, wherein the second CI mapping for the third carrier covers a second group of at least one target carrier including the fourth carrier, and wherein the first group of at least one target carrier is different from the second group of at least one target carrier.

23. The apparatus of claim 13, wherein the second carrier is determined based on a transmission mode configured for the UE.

24. The apparatus of claim 13, wherein a plurality of source carriers are allocated to the UE, wherein the plurality of source carriers includes the first carrier, wherein the CI mapping covers a plurality of target carriers on which resources are assigned, each target carrier of the plurality of target carriers associated with one of the plurality of source carriers.

25. A non-transitory computer-readable storage medium storing instructions that, when executed by a processor, cause the processor to perform operations comprising:
determining a first carrier on which to send a grant to a user equipment (UE);
determining a second carrier on which resources are assigned to the UE based on a carrier indicator (CI) mapping for the first carrier, wherein the CI mapping for the first carrier is specific to the UE, and wherein the CI mapping maps the first carrier to one or more additional carriers;
setting a CI field of the grant based on the second carrier and the CI mapping for the first carrier; and
sending the grant to the UE on the first carrier.

26. The non-transitory computer-readable storage medium of claim 25, wherein different UEs have different UE specific CI mappings for the first carrier.

27. The non-transitory computer-readable storage medium of claim 25, wherein the second carrier is determined based on a transmission mode configured for the UE.

28. An apparatus comprising:
means for determining a first carrier on which to send a grant to a user equipment (UE);
means for determining a second carrier on which resources are assigned to the UE based on a carrier indicator (CI) mapping for the first carrier, wherein the CI mapping for the first carrier is specific to the UE, and wherein the CI mapping maps the first carrier to one or more additional carriers;
means for setting a CI field of the grant based on the second carrier and the CI mapping for the first carrier; and
means for sending the grant to the UE on the first carrier.

29. The apparatus of claim 28, wherein different UEs have different UE specific CI mappings for the first carrier.

30. The apparatus of claim 28, wherein the apparatus includes:
means for determining a third carrier on which to send a second grant to the UE;
means for determining a fourth carrier on which resources are assigned to the UE;
means for setting the CI field of the second grant based on the fourth carrier on which resources are assigned to the UE and a second CI mapping for the third carrier; and
means for sending the second grant to the UE on the third carrier.

wherein the CI mapping for the first carrier covers a first group of at least one target carrier including the second carrier, wherein the second CI mapping for the third carrier covers a second group of at least one target carrier including the fourth carrier, and wherein the first group of at least one target carrier is different from the second group of at least one target carrier.

\* \* \* \* \*